June 25, 1968  J. F. KISHEL  3,389,607
TRI-AXIAL IMPACT INDICATOR
Filed Oct. 7, 1965  3 Sheets-Sheet 1
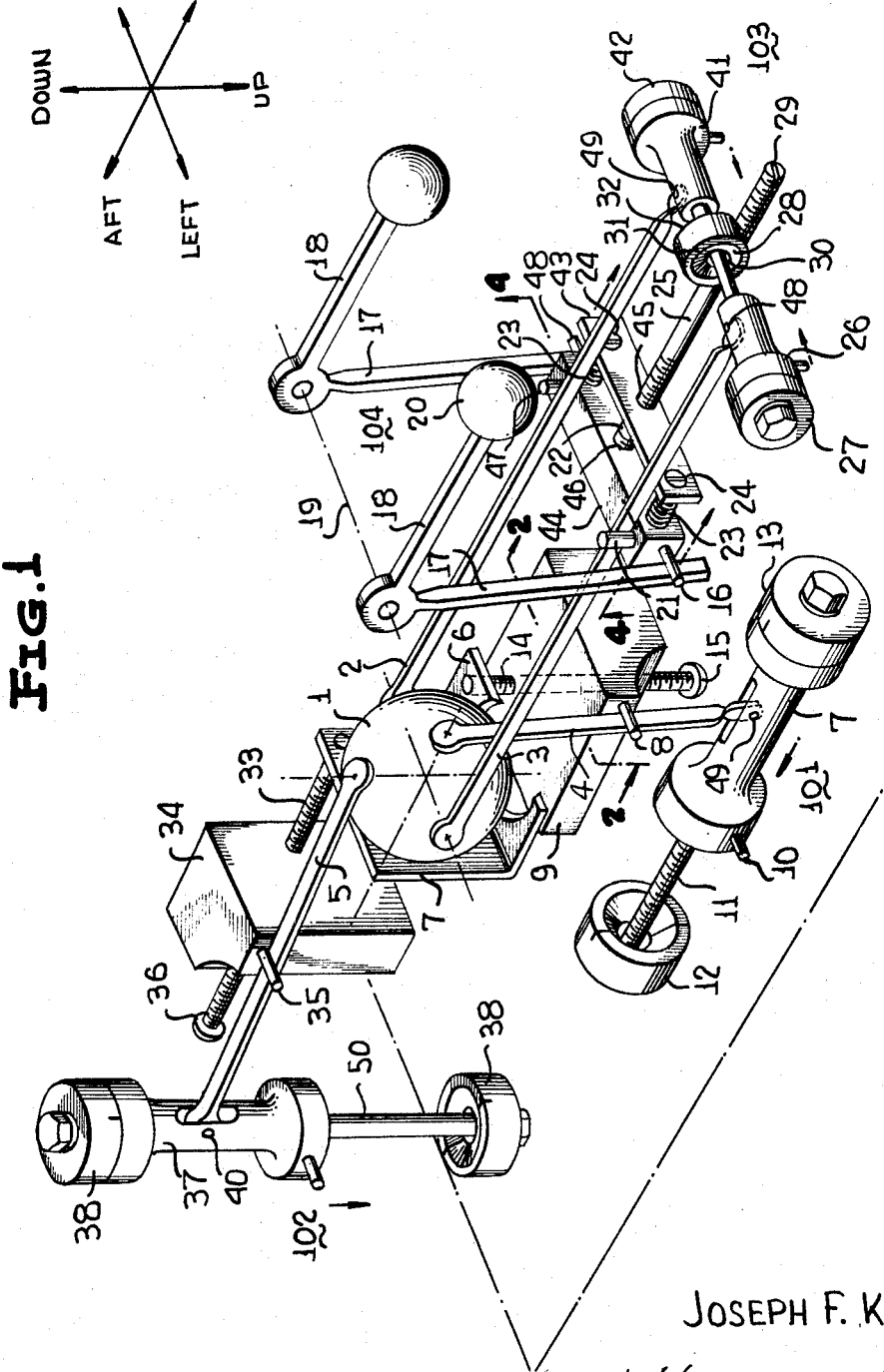
INVENTOR
JOSEPH F. KISHEL
BY *Hurwitz & Rose*
ATTORNEYS

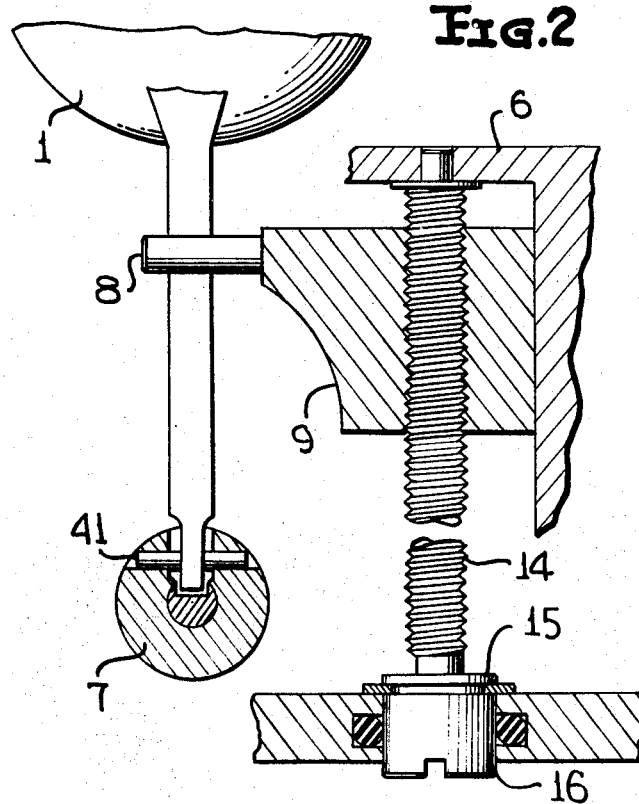
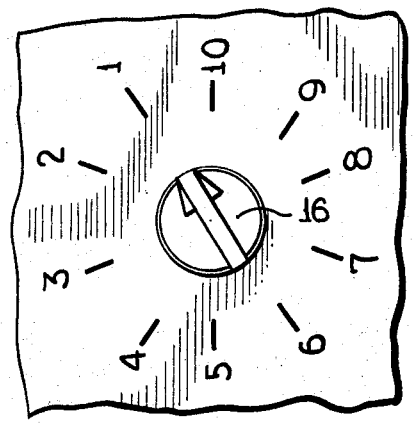

June 25, 1968  J. F. KISHEL  3,389,607
TRI-AXIAL IMPACT INDICATOR

Filed Oct. 7, 1965  3 Sheets-Sheet 3

INVENTOR
JOSEPH F. KISHEL

BY Hurvitz & Rose

ATTORNEYS

United States Patent Office 3,389,607
Patented June 25, 1968

3,389,607
TRI-AXIAL IMPACT INDICATOR
Joseph F. Kishel, Springfield, N.J., assignor to Weston Instruments, Inc., Newark, N.J., a corporation of Texas
Filed Oct. 7, 1965, Ser. No. 493,623
15 Claims. (Cl. 73—492)

ABSTRACT OF THE DISCLOSURE

A tri-axial acceleration responsive device used in conjunction with aircraft landing gear to determine when predetermined or critical stresses have been exceeded upon impact. Said device being of the go, no-go variety wherein an inertial mass in response to acceleration forces will act upon a plurality of pivotal levers, each of them responsive to movement in only one plane, and each having a magnetic switching means positioned at the other end of the lever pivot point from said inertial mass.

---

The present invention relates to acceleration responsive apparatus, and in particular, to devices for indicating whether or not a predetermined acceleration has been exceeded.

In the field of aviation, the landing of jet powered aircraft has presented substantial problems in the great amount of stress required to be borne by the aircraft landing gear. This is especially so, where the aircraft is to be landed on a landing surface of relatively short length, such as provided by a naval aircraft carrier. The design of landing gear for such aircraft involves the determination of various factors, including the maximum safe stress thereon due to the impact of the gear as it strikes the landing surface and as the aircraft is restrained by cross-deck or runway pendants. Landing gear capable of withstanding any magnitude of impact force that conceivably might occur would require a landing gear construction having a weight factor inconsistent with the design and operation of such aircraft. Therefore, the design parameters of such landing gear generally maintain a compromise between the maximum safe stress figure and the other significant design parameters involved. With respect to the characteristics and design of such aircraft landing gear, it is sufficient for the purpose of the present invention to note that during the repeated landing of such aircraft, the landing gear is subjected to repeated impact forces as a result of the rapid deceleration of the aircraft, any single one of which, may exceed the maximum safe tolerable stress limit of the gear. The landing gear may then develop certain strains within its structure, which if not detected would, with a high degree of probability, lead to its failure and the crash landing of the aircraft.

It is generally known that the greatest deceleration force developed in the landing gear is on impact with the landing surface and pendants. The force produced by the deceleration can be resolved into a vector having one component in the vertical direction, one component in the lateral direction, and one component in the forward direction, since the aircraft on striking the landing surface and on engagement of the arresting hook with the cross-deck or runway pendants will tend to veer off toward a direction which is generally fore and lateral before the aircraft is brought to a relatively abrupt stop. On landing, the relative magnitudes of the vector components in each axial direction will depend, inter alia, on the angle of approach with respect to the landing surface and the pendants. Thus, if the angle of descent is relatively great and the approach is relatively on center, the greatest force components will lie in the vertical and forward direction. The determination of whether certain maximum safe stresses have been exceeded are thus significant in these directions. The component in the forward direction will essentially be a function of the landing speed while the components in the vertical and lateral directions, although also dependent on the landing speed, will vary greatly with changes in the relative angles of the landing approach and the orientation of the aircraft with respect to the landing surface. Hence, for a vector force component of a given magnitude in a plane defined by the vertical and lateral axes (i.e., the projection of the resultant force vector on such a plane), the greater the magnitude of the vertical component, the smaller will be the magnitude of the lateral component. Therefore, since the maximum safe stress of the landing gear structure is a particular force per unit area at the weakest point, it is essential that the threshold of detection in each of these two directions be so variable as to respond to changes in the direction of the resultant vector force. That is, as the angle of descent increases, all other landing conditions being the same, the vertical component of force will increase in magnitude. Since the query of interest is whether or not a certain given magnitude of resultant force has been exceeded, the threshold of detection for the lateral component should now be lowered.

Thus, if any vector force component in the plane which passes through the vertical and horizontal axes (and is thus, the resultant of the vertical and lateral components), is greater than a predetermined magnitude, it should be detected.

Accordingly, it is an object of the present invention to indicate when such a maximum or any other predetermined force has been exceeded.

It is a further object to provide an indication of the occurrence of such condition for an indefinite period of time.

Therefore, in accordance with the above objects, the present invention is so constructed as to be directly responsive to deceleration forces in three axial directions, whereby the threshold of detection in the lateral direction decreases with increasing deceleration in the vertical direction. A proof mass, consisting of a metal sphere, is supported by the ends of multiple sensing levers so arranged that the sensing levers detect the movement of the sphere in response to the acceleration of the unit in accordance with Newton's second law. It should be understood that the term "acceleration" is used in its generic sense to include positive changes in the rate of speed as well as negative changes, or deceleration. The levers are hinged to soft iron reciprocable keepers at their opposite extremities, and an adjustable pivot establishes the level of acceleration at which the sphere is able to overcome the torque due to the force of holding magnets which are in juxtapositon to the keepers. The adjustable pivots change the moment arm relationships of the sensing levers. Superimposed upon the manual moment arm adjustment of the lateral sensing levers, is a biasing element which reduces the externally set moment arm distance by an amount proportional to the deceleration acting perpendicular to the sensing direction. In this manner the present invention provides an indication of the occurrence of preset values of impact or acceleration along one or more orthogonal axes, where independent or interdependent axis force triggering levels can be established as desired.

In accordance with the present invention a device is provided which is rugged and, itself, capable of withstanding great acceleration and impulse forces as a result of aircraft landings on a relatively short surface, and especially when deceleration is accentuated by means external to the aircraft such as by arresting means conventionally used on aircraft carriers and runways.

The device is furthermore so constructed as to be able to retain its calibration over relatively long periods of use with component parts capable of relatively easy assembly and of no special critical nature.

Thus, it is a further object of the present invention to provide an accurate indication as to whether or not a given aircraft has been subjected to a preset force on landing, and to provide such indication in a manner suitable to permit the ground crew or pilot, or both, to determine such occurrence.

It is another object of the present invention to provide a device capable of easy adjustment for an indication at any number of different preset values of acceleration.

And still another object of the present invention is to provide such a device which has both high reliability in operation and economy of manufacture.

These and other objects and aspects of the invention will be apparent to those skilled in the art from the following more detailed description taken in conjunction with the appended drawings, wherein:

FIGURE 1 is an expanded isometric view of the mechanism in accordance with the present invention;

FIGURE 2 is a partial cross-section taken in the direction of the arrows 2—2 of FIGURE 1;

FIGURE 3 is an orthogonal bottom view of FIGURE 2;

FIGURE 4 is a partial cross-section taken in the direction of the arrows 4—4 of FIGURE 1;

Figure 5:
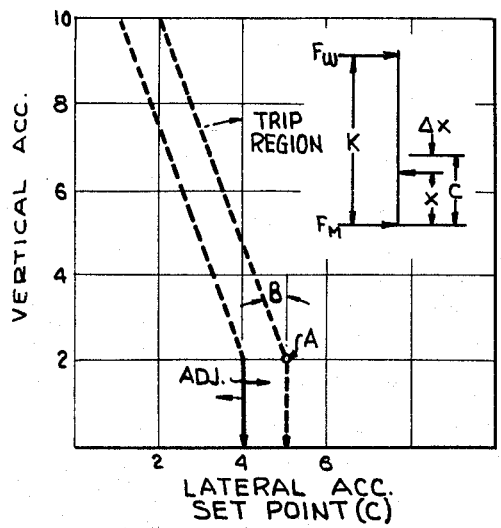
FIGURE 5 is a graph illustrating the trip profile of the invention as a function of the vertical and lateral acceleration.

Particularly, referring to FIGURE 1 of the drawings, a proof mass 1 is supported in four directions by sensing levers 2, 3, 4 and 5 and in the remaining two directions by the supporting wall structures 6 and 7. It should be noted that as indicated in FIGURE 1, the special orientation is such that the direction toward the top of the drawing represents the downward vertical direction as the device is intended to be installed in the aircraft. The expanded view shows the device in an inverted position only for the purpose of better illustrating its construction.

The present invention may be described in terms of four functional response units, viz., the fore-threshold assembly 101, the vertical-threshold assembly 102, the lateral-threshold assembly 103, and the vertical force bias assembly 104.

The fore-threshold assembly 101 comprises a sensing lever 4 which has one end in direct mechanical contact with the spherical proof mass 1 at a point on the spherical surface that is oriented in a direction coincident with the forward direction of the aircraft. The opposite end of the sensing lever 4 is connected to the keeper 7 via pin 41 in a hinge arrangement as shown in FIGURE 1, and in more detail in FIGURE 2. An adjustable pivot pin 8 serves as a fulcrum for the sensing lever 4 and is mechanically attached to the carriage member 9 by welding, or preferably by being pressure fitted into a hole provided therein.

The keeper may be composed of soft iron or other magnetic material and is slidably and reciprocably mounted on shaft 11. Holding magnet 13 and latching magnet 12 are mounted at opposite ends of shaft 11 and secured thereto by a stud and nut arrangement as shown, although other fastening means well known in the art might be utilized. Actuating pin 10, the purpose of which will hereinafter become evident, extends outwardly from the surface of keeper 7. The shaft 11, the holding magnet 13 and the latching magnet 12 are rigidly attached to the frame structure which forms a portion of the housing for the mechanism shown in FIGURE 1. This frame and housing structure has been omitted from the figure better illustrate the device mechanism.

The member 9 which supports the adjustable pivot 8 is adapted to be continuously positionable at various distances from the pivot 41 by mechanical cooperation with the screw 14. The member 9 is drilled and tapped to accommodate the adjustment screw 14 which is rotatably fixed to the supporting wall 6 at one end thereof, and in a like manner fixed to the housing wall at the opposite end 15, as shown in FIGURE 2. The vertical-threshold assembly 102 is constructed in a similar manner to the fore-threshold assembly 101 and comprises sensing lever 5, which is in direct mechanical contact with the spherical mass 1 at the point of intersection of the spherical surface and the vertical axis of the sphere. The opposite end of lever 5 is hinged to keeper 37 and is adapted to pivot about the fulcrum 35. Keeper 37, which is similar to keeper 7, is slidably mounted on shaft 42. Latching magnet 39 and holding magnet 38 are fixed to opposite ends thereof in a similar fashion to magnets 12 and 13. Screw 33 mechanically operates with the tapped member 34 to adjust the position of the fulcrum 35 relative to the hinged pivot pin at 40. The screw 33 is rotatably fixed at one end to the support wall 7, and at the other end to the housing wall at 36.

The lateral-threshold assembly 103 comprises right and left lateral sensing levers 2 and 3 respectively, which are in direct mechanical contact at one end with the spherical mass 1, tangential to the surface thereof at the horizontal axis of the sphere. The opposite ends of the levers 2 and 3 are each respectively hinged to keepers 41 and 26, which are slidably mounted on shaft 28. Right and left holding magnets 42 and 27 are each mounted at the extreme ends of the shaft 28 and are fixed in position thereon.

Latching magnet 31 is fixed on shaft 28 intermediate the holding magnets 42 and 27 and equidistant therebetween. Shaft 28 may either be a single continuous length or formed of a plurality of sections. The latching magnet 31 has double magnetic faces 32 and 30, respectively, and is so positioned as to provide sufficient clearance for the adjustment screw 25 thereunder. Alternatively, the body of the latching magnet 31 may contain a bore therethrough adapted to receive the screw 25 in free rotatable relation therewith. The adjustment screw 25 threadedly engages member 43 through a tapped hole 45 and then passes through a hole 46 in the member 44. The hole 46 is not threaded and screw 25 is freely rotatable therein. The end of screw 25 which passes through hole 46 is supported by the frame structure shown in FIGURE 4. Springs 23, symmetrically positioned about the screw 25, together with retaining rods 46, maintain members 43 and 44 in spaced relation to each other.

The compression of springs 23 should be adjusted to be of equal magnitude by setting the retaining rods 46, which may be threaded to a nut or other fastening device. The springs 23 may be prestressed during manufacture in a known manner to provide a spring characteristic having a required minimum threshold force for causing compression thereof. Member 44 supports pivot pins 47 and 21 which function as the respective fulcrums for levers 2 and 3. The assembly of members 43 and 44, and springs 23 with their associated parts, are thus adapted to be positioned in fixed relation to each other at variable distances from the hinged pivots 48 and 49 by varying the adjustment of screw 25.

The vertical force bias detector 104 comprises essentially two symmetrical mass elements 20, which are attached to arms 17 and 18 having a fixed pivot point about axis 19 fastened to the frame structure of the device (not shown). Arms 17 engage pivot pins 15 and 48 to provide a force in the direction of the arrows, tending to move member 44 toward member 43. Member 43 is in fixed relation to hinge pivots 48 and 49, the distance of which can only be changed by turning adjustment screw 25.

The adjustment screws 15, 25 and 33 each have an end thereof which passes through and is supported by a wall of the device housing. The end of said screws may be provided with a slot as shown in FIGURE 2 and a scale may be provided as shown in FIGURE 3 for calibration. Obviously, other means for adjusting the screws and providing calibration might be used, such as, for example, vernier scales and geared controls.

In the operation of the present invention, the fore-threshold adjustment screw is set to provide the proper moment arm between pivots 8 and 49 such that a given level of deceleration acting on the proof mass 1 in the forward direction is sufficient to force the sensing lever 4 to pivot about the fulcrum 8 and overcome the torque due to the holding magnet 13. In response to said given level of deceleration in the forward direction, the keeper 7 becomes free of holding magnet 13 and slides along shaft 11 to a position adjacent the latching magnet 12, and is thus permanently retained thereby until released.

Likewise, the vertical-threshold adjustment screw 33 is set to provide the proper moment arm between pivots 35 and 40 such that a given level of deceleration acting on the proof mass 1 in the vertical downward direction forces the sensing lever 5 to pivot about the fulcrum 35 to overcome the torque due to the holding magnet 38. In response to said given level of deceleration, the keeper 37 becomes free of the holding magnet 38 and slides along shaft 50 to a position adjacent the latching magnet 39, and is thus permanently retained thereby until released.

The lateral-threshold adjustment screw 25 provides a manual lateral trip-line set point adjustment which has superimposed thereon, a bias developed by the vertical force bias detector 104. Lateral decelerations of sufficient magnitude, either right or left, force the appropriate lever to pivot about its fulcrum to overcome the torque due to either of the holding magnets 42 or 27. Additionally, the downward vertical deceleration causes the mass elements 20 to produce a force at pins 15 and 48 in the direction indicated by the arrows, which reduces the externally set lateral-threshold moment arm by an amount proportional to the deceleration acting in the downward vertical direction.

Figure 6:
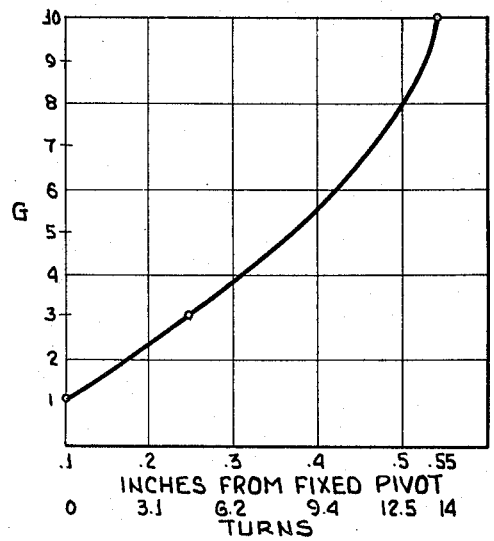
FIGURE 6 is a graph illustrating the relationship between the acceleration in an axial direction and the external adjustment of the device in accordance with the invention.

Thus, as graphed in FIGURE 6, the manual external adjustment screws are calibrated such that for a preset acceleration (in g's), the keeper associated therewith will trip. As for example, where it is desired to detect whether an acceleration of 4 g has been exceeded, the adjustment screw is set at 6.8 turns, which provides a moment arm distance of 0.32 inch.

With relation to the lateral-threshold indicator which is biased by the downward vertical deceleration, with reference to FIGURE 5, K is the distance between the point of application of the force $F_w$ of the proof mass 1 on a lateral sensing arm (e.g., 3) and the point of application of the magnetic force $F_m$ on that same arm at the hinging point (48);

C is the distance which is manually adjusted by setting the screw 25 at 29;

$\Delta x$ is the change in the fulcrum position due to the vertical force on the mass elements 20; and $x$ is the actual moment arm distance from the fulcrum (e.g., 21) to the hinging point (48).

Then, balancing the moments yields $$F_w(K-x) = F_m x \quad (1)$$

and $$x = \frac{KF_w}{F_w + F_m} \quad (2)$$

However, the force $F_v$ applied at pivots 16 and 48 is proportional to the vertical deceleration of the unit and can be represented by the following relationships (assuming no prestressing of the spring), $$F_v = B \Delta x$$

where B is the total spring constant of springs 23.

Since $$\Delta x = C - x$$

$$F_v = B(c-x) \quad (3)$$

and $$x = \frac{BC - F_v}{B} \quad (4)$$

Substituting Equation 4 into Equation 2 yields, $$\frac{BC - F_v}{B} = \frac{KF_w}{F_w + F_m} \quad (5)$$

and $$F_v = -B\left[\frac{KF_w}{F_w + F_m} + C\right] \quad (6)$$

Thus, the Equation 6 indicates that the vertical forces are related hyperbolically to the lateral forces, and where $F_w + F_m$ is approximately equal to unity, the function is a straight line having a negative slope proportional to the spring constant B.

The trip envelope is shown by a straight line approximation in FIGURE 5, however, the portion below point A indicates the nonresponsive characteristic of the prestressed springs to vertical forces below a certain magnitude, for example, 2 g, as shown. The slope of the envelope can be varied by changing the spring constant B.

The trip envelope may also be plotted according to Equation 6 if greater accuracy is required.

In use, the desired thesholds are set externally by using the calibrated screws associated with each axis, as shown in FIGURE 3, utilizing the calibration graph shown in FIGURE 6. When the aircraft has landed, observation of the position of each keeper will indicate whether or not the respective thresholds had been exceeded. As the force in the vertical direction increases, the amount of force in the lateral direction required to trip keepers 26 or 41 decreases. Therefore, if, for example, the left lateral keeper was latched in the tripped position and the adjustment 29 had been set for a threshold of 4 g, and further, that the vertical-threshold had been set at 6 g and had not been tripped, a reading of the graph shown in FIGURE 5 indicates that the component of deceleration in the left-lateral direction had exceeded a magnitude of 2.4 g. For a lateral-threshold external adjustment set at 4 g, any combination of vertical and lateral decelerations falling in the trip region of FIGURE 5 will cause the appropriate lateral keeper to latch.

Figure 7:
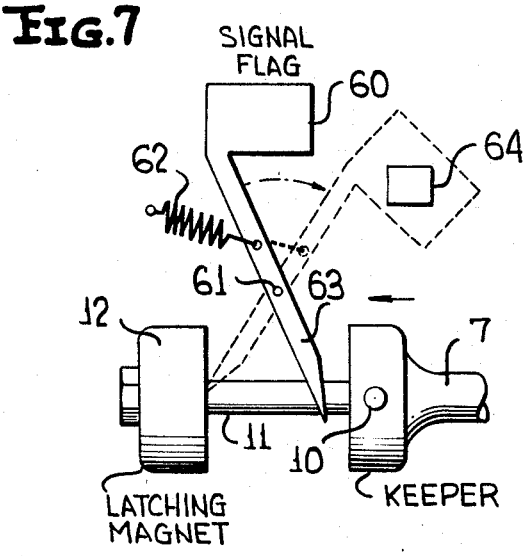
FIGURE 7 is one embodiment of an indicating assembly in accordance with the present invention.

Various ways might be used to indicate the position of the various threshold keepers, i.e., as to whether or not they had been tripped during the landing of the aircraft. Referring to FIGURE 7, there is shown one technique using a signal flag 60, which may be of a particular color, pivoted about a fixed point 61 and retained in a non-actuated position by a spring 62. The spring and pivot are securely attached to the device housing (not shown). On exceeding the preset threshold acceleration, the keeper 7 slides into position adjacent the latching magnet 12, whereupon the actuating pin 10 engages the cammed surface of the lever 63 and pivots said lever about point 61 against the force of spring 62. This drops flag 60 in viewing position through window 64 disposed in the housing, providing a positive indication external of the device that the preset threshold of acceleration has been exceeded.

Figure 8:
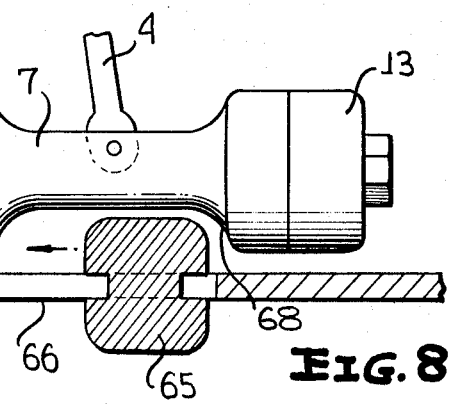
FIGURE 8 is a second embodiment of an indicating assembly in accordance with the present invention.

As an alternative construction, a slidable member 65 is provided as shown in FIGURE 8, within a slot 66 disposed adjacent the keeper 7 in the housing 67. On exceeding the preset threshold acceleration, the keeper 7 slides along shaft 11, breaking away from the holding magnet 13 to be latched by magnet 12. Thus, the slidable member 64 is engaged by the surface of the keeper end piece 68 and moved to a position on the opposite end of slot 66 to provide the required indication. Another construction might be merely the utilization of a transparent area in the housing to provide a direct view of the position of the keeper. Any such means might be provided, the above constructions being merely exemplary.

Additionally, the actuating or indicating mechanism might be provided with an electrical switching device for remotely receiving said indication. For example, switch contacts might be provided and adapted to be actuated by the slidable member 65, or the actuating pin 10, to give an indication, e.g., in the form of a signal light in the cockpit of the aircraft.

Another embodiment in accordance with the present invention provides a counter which is actuated by the latching of the keeper to compound and record the total number of times that a preset threshold of acceleration has been exceeded. The counter may be of any mechanical or electrical type and construction.

The resetting of the keeper after it has been tripped may be done manually or remotely, for example, by electrically actuating a solenoid having a mechanical linkage adapted to slide the keeper to its original position in relation to the holding magnet. Alternatively, actuation may be provided hydraulically or by any suitable means.

Although the invention has been described primarily with reference to use in aircraft, the invention may be used in other devices where there is necessity to determine whether or not a preset threshold of acceleration has been exceeded, and particularly where such acceleration may have components in more than one axial direction.

While I have described and illustrated one specific embodiment of my invention, it will be clear that variation of the details of construction which are specifically illustrated and described may be resorted to without departing from the true spirit and scope of the invention as defined in the appended claims.

What is claimed is:

1. Apparatus for detecting the occurrence of a predetermined magnitude of acceleration comprising:
   inertia means adapted to change position in response to an acceleration imparted thereto greater than a predetermined magnitude;
   a plurality of lever means being mechanically responsive to the movement of said inertia means;
   and each being adapted to pivot about a fulcrum associated therewith;
   each of said lever means being responsive to the movement of said inertia means in only one of a plurality of directions;
   a plurality of reciprocable means magnetically retained in a first of two alternate positions, each being pivotly connected to a corresponding one of said plurality of lever means whereby on exceeding said predetermined acceleration in a given direction, the lever means associated therewith causes said corresponding reciprocable means to move to said second position.

2. The apparatus according to claim 1 wherein a fulcrum associated with at least one of said lever means is movable with respect thereto so as to be capable of changing the moment arms thereof.

3. The apparatus according to claim 1 wherein said reciprocable means is latchable in said second position.

4. Apparatus for detecting the occurrence of a predetermined magnitude of acceleration comprising:
   first inertia means adapted to change position in response to an acceleration imparted thereto greater than a predetermined magnitude;
   lever means being mechanically responsive to the movement of said inertia means in a first given direction and including a fulcrum pivotly related therewith;
   a reciprocable means pivotly connected to said lever means and retained in a first of two alternate positions;
   second inertia means adapted to change position in response to an acceleration imparted thereto in a second direction perpendicular to said first direction;
   means mechanically responsive to said change in position of said second inertia means for varying the position of the fulcrum of said lever means with respect thereto such that the moment arm thereof is related to the acceleration in said second direction;
   whereby on exceeding a certain acceleration in said first and second directions, said lever means causes said reciprocable means to move to said second position.

5. Apparatus according to claim 4 wherein said reciprocable means is magnetically retained in said first position and magnetically latchable in said second position.

6. Apparatus according to claim 4 further comprising means for manually varying the position of said fulcrum with respect to said lever means whereby the moment arm of said lever means is a function of said manual adjustment and said acceleration in said second direction.

7. Apparatus according to claim 6 wherein said means for manually varying the position of said fulcrum comprises carriage means having pivot means fixed thereto and being in threaded engagement with screw means whereby on rotation of said screw means, said carriage means is movable along the length thereof.

8. Apparatus comprising:
   first inertia means adapted to change position in response to an acceleration imparted thereto greater than a given magnitude;
   a plurality of lever means being mechanically responsive to the movement of said first inertia means and each being adapted to pivot about a fulcrum associated therewith;
   each of said lever means being responsive to the movement of said first inertia means in only one of a plurality of directions;
   a plurality of reciprocable means normally retained in a first of two alternate positions, each being mechanically connected to a corresponding one of said plurality of lever means;
   second inertia means adapted to change position in response to an acceleration imparted thereto in one of said plurality of directions;
   means responsive to said change in position of said second inertia means; said responsive means mechanically coacting with a fulcrum associated with the lever means that is responsive to the movement of said first inertia means in a direction different than said one direction for varying the position of said fulcrum with respect to said lever means such that the moment arm thereof is related to the acceleration in said one direction;
   whereby on exceeding a given acceleration in said one and different directions, said lever means corresponding to said different direction causes the reciprocable means corresponding thereto to move to said second position.

9. Apparatus according to claim 8 wherein said one and different directions are in perpendicular relation to each other.

10. Apparatus according to claim 8 wherein said reciprocable means is normally magnetically retained in said first position and is magnetically latchable in said second position.

11. Apparatus comprising inertia means responsive to an acceleration imparted thereto greater than a predetermined magnitude; and magnetic means mechanically responsive to said inertia means for providing an indication that a component of said acceleration in each of a plurality of directions has exceeded a given threshold magnitude.

12. Apparatus according to claim 11 further comprising means responsive to an acceleration in one of said plurality of directions being in mechanical coacting relationship with said magnetic means to vary said threshold magnitude of a component of acceleration in a different direction.

13. Apparatus according to claim 11 further comprising magnetic latching means for maintaining said indication that a component of acceleration in a given direction has been exceeded.

14. Apparatus according to claim 4 wherein said mechanically responsive means includes spring means for providing a mechanical bias against the force produced by said change in position of said second inertia means.

15. Apparatus according to claim 2 wherein said fulcrum is in fixed relation to a carriage means which is in threaded engagement with screw means whereby on rotation of said screw means, said carriage means is movable along the length thereof.

References Cited

UNITED STATES PATENTS

| 2,078,616 | 4/1937 | Smith et al. | 73—517 |
| 2,539,736 | 1/1951 | Fraser | 200—61.5 |
| 2,816,188 | 12/1957 | Stout | 200—61.45 |
| 2,949,260 | 8/1960 | Smith et al. | 73—514 |
| 3,136,293 | 6/1964 | Schmitt | 116—114.29 |
| 3,267,739 | 8/1966 | Epps et al. | 116—114.29 |
| 3,312,188 | 4/1967 | Lode et al. | 116—114.29 |

FOREIGN PATENTS

| 446,230 | 4/1936 | Great Britain. |

JAMES J. GILL, *Primary Examiner.*

ROBERT S. SALZMAN, *Assistant Examiner.*